United States Patent Office 3,778,511
Patented Dec. 11, 1973

3,778,511
α-(1,2,3,4 - TETRAHYDRO-6-QUINOYL)-CARBOXYLIC ACIDS AND DERIVATIVES THEREOF FOR TREATING INFLAMMATION
Raymond Bernasconi, Oberwil, Basel-Land, Switzerland, assignor to Ciba-Geigy Corporation
No Drawing. Original application Apr. 14, 1970, Ser. No. 28,532, now abandoned. Divided and this application Aug. 23, 1972, Ser. No. 283,009
Claims priority, application Switzerland, Apr. 21, 1969, 5,972/69; Mar. 4, 1970, 3,132/70
Int. Cl. A61k 21/00
U.S. Cl. 424—258      4 Claims

ABSTRACT OF THE DISCLOSURE (1,2,3,4-tetrahydro-6-quinolyl)-acetic acids substituted in at least one of the positions 1–5, 7, 8 and α, in which substituents optionally present in the α-position and/or 1-position are lower aliphatic or cycloaliphatic hydrocarbon residues, their esters and derivatives, in which two hetero-atoms, of which at least one is a nitrogen atom, are bonded to the C-atom of the modified carboxyl group, and their salts are useful as antiphlogistic agents.

This is a division of application Ser. No. 28,532, filed Apr. 14, 1970, now abandoned.

SUMMARY OF THE INVENTION

The present invention relates to new (1,2,3,4-tetrahydro-6-quinolyl)-acetic acids and derivatives thereof. Especially it concerns (1,2,3,4-tetrahydro-6-quinolyl)-acetic acids substituted in at least one of the positions 1–5, 7, 8 and α, in which substituents optionally present in the α-position and/or 1-position are lower aliphatic or cycloaliphatic hydrocarbon residues, their esters and derivatives, in which two hetero-atoms, of which at least one is a nitrogen atom, are bonded to the C-atom of the modified carboxyl group, and their salts as well as pharmaceutical preparations containing those compounds and a process for treating inflammation which consists in administering to a warm blooded being such pharmaceutical preparations.

The lower aliphatic hydrocarbon residues may be saturated or unsaturated. Saturated lower aliphatic hydrocarbon residues, that is to say lower alkyl residues, are above all residues having not more than 6 carbon atoms, such as methyl, ethyl, n-propyl or isopropyl residues, or straight-chain or branched butyl, pentyl or hexyl residues bonded in any desired position.

Unsaturated lower aliphatic hydrocarbon residues as substituents of the α-C-atom are preferably residues which are linked to the α-positioned C-atom mentioned via a double bond, such as alkylidene residues, for example methylene, ethylidene, propylidene or butylidene residues. The lower cycloaliphatic hydrocarbon residues may be unsaturated but are preferably saturated. As saturated residues of this nature, lower cycloalkyl residues, for example residues having 3–7 ring members, such as cyclopropyl, cyclobutyl, cyclopentyl, cyclohexyl and cycloheptyl residues, should particularly be mentioned.

In the new compounds the nitrogen atom of the heterocyclic ring may be unsubstituted but is preferably substituted, above all by lower alkyl residues, such as those mentioned, or lower alkenyl residues, such as allyl or methallyl residues.

The C-atom which is in the α-position relative to the carboxyl group can be unsubstituted but is preferably substituted as mentioned above.

The methylene groups of the heterocyclic ring may be yet further substituted, especially by alkyl groups, such as those quoted above.

The carbocyclic ring may carry yet further substituents, above all alkyl groups, such as those mentioned, halogen atoms, for example fluorine, chlorine, bromine or iodine atoms, trifluoromethyl groups, nitrile, nitro or amino groups, acylamino groups, especially lower alkanoylamino, such as acetylamino, or benzoylamino groups, hydroxyl groups, alkoxy groups, especially alkoxy groups containing the alkyl groups mentioned, sulphamyl, free mercapto, alkylmercapto, alkylsulphonyl or alkylsulphinyl groups. In the latter substituents lower alkyl, such as one of the abovementioned lower alkyl residues, is particularly to be understood by alkyl.

Esters according to the invention are especially esters of which the alcoholic component is derived from hydrocarbon residues of aliphatic character, for example from those mentioned above, or from aralkyl residues, above all aryl-lower alkyl residues, such as phenyl-lower alkyl residues, for example benzyl residues.

Carboxylic acid derivatives in which two hetero-atoms, of which at least one is a nitrogen atom, are linked to the C-atom of the modified carboxyl group are for example amides and hydroxamic acids.

The new compounds possess valuable pharmacological properties, above all an anti-inflammatory action. Thus for example they show a distinct anti-inflammatory action in the adjuvans arthritis test on rats when orally administered in a dose of 30–100 mg./kg. Furthermore, in the Writhing test (benzoquinone) on the mouse, they have a distinct antinociceptive effect on oral administration of 300 mg./kg. The compounds therefore are useful as antiphlogistics, but are also valuable intermediate products for the manufacture of other useful substances, especially of pharmacologically active substances.

Compounds to be particularly highlighted are (1,2,3,4-tetrahydro-6-quinolyl)-acetic acids which are substituted at the nitrogen atom and/or in the α-position as mentioned above and which can be substituted on the carbocyclic ring by lower alkyl groups, lower alkoxy groups, halogen atoms or trifluoromethyl groups, but especially those compounds which only carry one of the substituents mentioned in the carbocyclic ring or alternatively are unsubstituted in the carbocyclic ring.

Valuable compounds are above all (1,2,3,4-tetrahydro-6-quinolyl)-acetic acids which are substituted at the nitrogen atom and/or in the α-position as mentioned above, preferably by lower alkyl groups, and which carry a methoxy group, a chlorine atom or a trifluoromethyl group or especially no further substituent on the carbocyclic ring.

At the same time particular importance attaches to those (1,2,3,4-tetrahydro-6-quinolyl)-acetic acids which are substituted by a methyl or ethyl group at the nitrogen atom and/or are substituted by a methyl or methylene group in the α-position and which carry on the carbocyclic ring, preferably in 8-position, a methoxy group, a chlorine atom or a trifluoromethyl group or especially no further substituent.

Compounds to be particularly mentioned are
α-(1-methyl-8-chloro-1,2,3,4-tetrahydro-6-quinolyl)-acetic acid,
(1-methyl-1,2,3,4-tetrahydro-6-quinolyl)-acetic acid,
α-(1-methyl-8-chloro-1,2,3,4-tetrahydro-6-quinolyl)-propionic acid and above all
α-(1-methyl-1,2,3-tetrahydro-6-quinolyl)-propionic acid
of formula

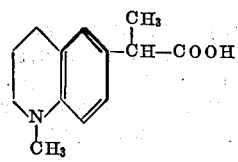

which for example shows a pronounced anti-inflammatory action in the adjuvans arthritis test on rats on oral administration of 30–100 mg./kg.

The new compounds are obtained according to methods which are in themselves known.

Thus, for example, for preparing compounds substituted in position 1 an aliphatic or cycloaliphatic hydrocarbon residue, especially an alkyl residue, is introduced in the 1-position of an ester of a (1,2,3,4-tetrahydro-6-quinolyl)-acetic acid carrying a hydrogen atom in position 1. The reaction may be performed in the usual manner, especially with a reactive ester of an appropriate alcohol, above all with a halide, such as chloride, bromide or iodide, preferably in the presence of an acid-binding reagent, for example a basic reagent, such as potassium carbonate or hydroxide.

The free acids can also be prepared by hydrolysis of a corresponding nitrile. The reaction is performed in the usual manner, for example with alkaline reagents, for example dilute aqueous alkalis, for example sodium hydroxide, or especially with acid reagents, for example dilute mineral acids, such as sulphuric or hydrochloric acid, preferably at elevated temperature.

The hydrolysis of the nitrile group, can if desired, only be taken to the formation of the carbamoyl group. The hydrolysis is in this case appropriately performed with, for example, 96% strength sulphuric acid or weakly alkaline hydrogen peroxide, for example hydrogen peroxide containing sodium hydroxide.

The nitrile can also be reacted with an alcohol to form an ester, appropriately in the presence of alkaline reagents, such as an alkali salt, for example a sodium salt of the alcohol, or preferably in the presence of acid reagents, for example hydrochloric acid or sulphuric acid, advantageously in the presence of ammonium chloride.

Compounds which are substituted in the α-position can be obtained by introducing an aliphatic or cycloaliphatic hydrocarbon residue in the α-position of a corresponding (1,2,3,4 - tetrahydro - 6 - quinolyl)-acetic acid derivative which carries at least one hydrogen atom in position α. It is for example possible to convert an appropriate compound, above all an ester, into the α-metal salt, for example by reaction with strong bases such as alkali metal amides, such as sodium amide, and then to react this α-metal salt with a reactive ester of an appropriate alcohol, for example a lower alkanol. Reactive esters are especially those with hydrogen halide acids, such as hydrochloric, hydrobromic or hydriodic acid.

Compounds which are substituted in the benzene ring by a halogen atom, especially a chlorine atom, may be obtained by direct halogenation of a corresponding compound having unsubstituted positions in the benzene ring.

The reaction may be performed with elementary halogen or with reagents which release halogen, appropriately in the presence of catalysts, for example iron chloride.

In the new compounds, substituents can be introduced, modified or split off within the framework of the final substances.

Thus it is for example possible to convert free carboxyl groups, esterified carboxyl groups and nitrogen-containing modified carboxyl groups of the nature mentioned into one another.

Esterified carboxyl groups, amidised carboxyl groups, that is to say carbamyl groups, and hydroxyaminocarbonyl groups can be converted into free carboxyl groups in the usual manner, for example by hydrolysis, preferably in the presence of strong bases or of mineral acids, for example those mentioned above. If desired, oxidising agents such as nitrous acid can be added in the hydrolysis of carbamyl groups.

Free or esterified groups can also be converted into hydroxyaminocarbonyl or carbamyl groups in the usual manner, for example by reaction with hydroxylamine, ammonia or amines possessing at least one hydrogen atom on the nitrogen atom, and, where appropriate, dehydration of the hydroxylammonium or ammonium salt produced as an intermediate.

Free carboxyl groups can be esterified in the usual manner, for example by reaction with an appropriate alcohol, advantageously in the presence of an acid such as a mineral acid, for example sulphuric acid or hydrochloric acid, or by reaction with an appropriate diazo compound, for example a diazoalkane.

Free carboxyl groups can for example also be converted into acid halide, or acid anhydride groupings in the usual manner, for example by reaction with halides of phosphorus or sulphur, such as thionyl chloride, phosphorus pentachloride or phosphorus tribromide, or by reaction with acid halides such as chloroformic acid esters. The acid anhydride or acid halide groups can then be converted into esterified carboxyl groups, hydroxyaminocarbonyl groups or carbamyl groups in the usual manner by reaction with appropriate alcohols, if desired in the presence of acid-binding reagents such as organic or inorganic bases, for example those mentioned, by reaction with hydroxylamine or by reaction with ammonia.

In the new compounds which are substituted by an unsaturated residue in the α-position, or in position 1, this residue can be hydrogenated. The hydrogenation takes place in the usual manner, above all with catalytically activated hydrogen, for example as mentioned above, or with nascent hydrogen, for example with sodium and alcohol.

In resulting compounds halogen atoms can also be directly introduced into the benzene ring. The introduction takes place for example as indicated above.

The reactions mentioned can be carried out in the usual manner in the presence or absence of diluents, condensation agents and/or catalytic agents at lowered, ordinary or elevated temperature, optionally in a closed vessel and/or under an inert gas atmosphere.

Depending on the process conditions and starting substances, final substances are obtained in the free form or in the form of their salts which are also included in the invention. Resulting free compounds having acid groups, such as carboxylic acids or hydroxamic acids, can be converted into the salts with bases in the usual manner, for example by reaction with appropriate basic reagents, above all into therapeutically usable salts with bases, for example salts with organic amines or metal salts. Possible metal salts are above all alkali metal salts or alkaline earth metal salts such as sodium, potassium, magnesium or calcium salts. The free compounds can be liberated from the salts in the usual manner, for example by reaction with acid reagents. Resulting salts with acids can be converted into the free compounds in a manner which is in itself known, for example with alkalis or ion exchangers. Salts can be obtained from the free compounds by reaction with organic or inorganic acids, especially those which are suitable for the formation of therapeutically usable salts. As such acids there may for example be mentioned: hydrohalic acids, sulphuric acids, phosphoric acids, nitric acid, perchloric acid, aliphatic, alicyclic, aromatic or heterocyclic carboxylic or sulphonic acids, such as formic acetic, propionic, succinic, glycollic, lactic, malic, tartaric, citric, ascorbic, maleic hydroxymaleic or pyruvic acid; phenylacetic, benzoic, p-aminobenzoic, anthranilic, p-hydroxybenzoic salicylic or p-aminosalicylic acid, embonic acid, methanesulphonic, ethanesulphonic, hydroxyethanesulphonic or ethylenesulphonic acid; halogenobenzenesulphonic, toluenesulphonic or naphthalenesulphonic acid or sulphanilic acid; methionine, tryptophane, lysine or arginine. These and other salts can also be used for the purification of the new compounds, for example by converting the free compounds into their salts, isolating these and again converting these into the free compounds. As a result of the close relationships between the new compounds in the free form and in the form of their salts the corresponding salts are, where appropriate, also to be understood under the free compounds, in respect of sense and purpose, in the preceding and following text.

The new compounds can, depending on the choice of the starting substances and procedures and depending on the number of asymmetric carbon atoms, be in the form of optical antipodes, racemates or isomer mixtures (racemate mixtures).

Resulting isomer mixtures (racemate mixtures) can be separated into the two stereoisomeric (diastereomeric) pure racemates in a known manner on the basis of the physicochemical differences of the constituents, for example by chromatography and/or fractional crystallisation.

Resulting racemates can be resolved into the diastereomers according to known methods, for example by recrystallisation from an optically active solvent, with the aid of microorganisms, or by reaction with an optically active acid or base which forms salts with the racemic compound and separation of the salts obtained in this manner, for example, on the basis of their differing solubilities, and the antipodes can be liberated from the diastereomers by the action of suitable reagents. Particularly commonly used optically active acids are for example the D- and L-forms of tartaric acid, di-o-toluyltartaric acid, malic acid, mandelic acid, camphorsulphonic acid or quinic acid. Preferred optically active bases are for example brucine, strychnine, morphine, menthylamine or α-phenylethylamine or their quaternary ammonium bases. Advantageously, the more active or less toxic of the two antipodes is isolated.

It is however also possible to manufacture pure isomers, racemates or optical antipodes by starting from appropriate starting substances in the form of their pure isomers, racemates or optical antipodes.

The invention also relates to those embodiments of the process according to which one startes from a compound obtainable as an intermediate product at any stage of the process and carries out the missing process stages, or in which a starting substance is formed under the reaction conditions or in which a reaction component is optionally present in the form of its salts.

Appropriately, such starting substances are used for effecting the reactions according to the invention as lead to the initially particularly mentioned groups of final substances and particularly to the final substances which have been especially described or highlighted.

The starting substances are known or can, if they are new, be manufactured according to methods which are in themselves known. New starting substances also form a subject of the invention.

The new compounds can for example be employed in the form of pharmaceutical preparations in which they are present in the free form or optionally in the form of their salts, especially the alkali metal salts, or the therapeutically usable acid addition salts mixed with a pharmaceutical organic or inorganic, solid or liquid excipient which is for example suitable for enteral, parenteral or topical application. Suitable substances for forming the latter are those which do not react with the new compounds, such as for example water, gelatine, lactose, starch, stearyl alcohol, magnesium stearate, talc, vegetable, oils, benzyl alcohols, gum, propylene glycols, white petroleum jelly or other known medicinal excipients. The pharmaceutical preparations can for example be in the form of tablets, dragees, capsules, suppositories, creams, ointments or in a liquid form as solutions (for example as an elixir or syrup), suspensions or emulsions. They are optionally sterilised and/or contain auxiliary substances such as preservatives, stabilisers, wetting agents or emulsifiers, solubilising agents or salts for regulating the osmotic pressure or buffers. They can also contain other therapeutically valuable substances. The pharmaceutical preparations are formulated according to usual methods.

A further subject of the invention is a process for treating inflammation conditions in warm-blooded animals such as mammals characterised in that a (1,2,3,4-tetrahydro-6-quinolyl)-acetic acid, an ester or a derivative thereof, wherein two hetero-atoms, of which at least one is a nitrogen atom, are bonded to the C-atom of the modified carboxyl group, with these compounds being substituted as desired, for example as specified for the new final substances, is administered.

A further subject of the invention is pharmaceutical preparations, for example those indicated above, containing the (1,2,3,4-tetrahydro-6-quinolyl)-acetic acid, its esters or derivatives, in which two hetero-atoms, of which at least one is a nitrogen atom, are bonded to the C-atom of the modified carboxyl group. These products, in comparable doses, also possess the anti-inflammatory action indicated for the final substances according to the invention. The abovementioned esters and derivatives can, to the extent that they are not known, be obtained from the acid according to known methods.

The invention is described in more detail in the following examples.

EXAMPLE 1

15.0 g. of [1,2,3,4-tetrahydro-6-quinolyl]-acetic acid ethyl ester are dissolved in 250 ml. of acetone and methylated for 15 hours at 40° C. with 5.3 ml. of methyl iodide and 25.0 g. of potassium hydroxide. Thereafter the potassium hydroxide is filtered off and the filtrate is evaporated. The residue is dissolved in a little toluene and chromatographed on 300 g. of aluminum oxide (activity II, neutral). The first fractions eluted with 1.5 litres of toluene yield the [1-methyl-1,2,3,4-tetrahydro-6-quinolyl]-acetic acid ethyl ester of the formula

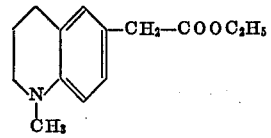

which represents a light yellow oil and shows an $R_f$-value of 0.7 in a thin layer chromatogram (silica gel; chloroform).

EXAMPLE 2

A solution of 0.97 g. of sodium and 30 mg. of hydrated iron (III) nitrate in 200 ml. of liquid ammonia is stirred until the colour of the solution changes from blue to dark grey. Thereafter a solution of 8.9 g. of [1-methyl-1,2,3,4-tetrahydro-6-quinolyl]-acetic acid ethyl ester in 25 ml. of absolute ether is added dropwise to the ammoniacal solution and the mixture is stirred for a further ½ hour. Thereafter a solution of 2.4 ml. of methyl iodide in 25 ml. of absolute ether is added dropwise and the solution is stirred for a further ½ hour. For working-up, 2.3 g. of ammonium chloride are first added in portions and the ammonia is evaporated off whilst stirring. The reaction mixture is taken up in 1 litre of chloroform:water, 1:1, and the organic phase is separated off and again rinsed with 300 ml. of water. The aqueous phases are again extracted with 300 ml. of chloroform and the organic extracts are combined, dried over sodium sulphate, filtered off and evaporated. The 2-[1-methyl-1,2,3,4-tetrahydro-6-quinolyl]-propionic acid ethyl ester of the formula

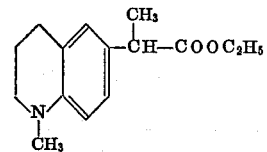

which remains as an oil is a single substance in a thin layer chromatogram (system: chloroform, saturated with ammonia, and toluene, 1:1; carried: silica gel; indicator: iodine). Infra-red spectrum (methylene chloride, 3%): bands at 3.45μ, 5.80μ, 6.20μ, 6.60μ, 8.45μ, 8.65μ (shoulder) and 9.15μ.

EXAMPLE 3

7.7 ml. of 40% strength sodium hydroxide solution are added to a solution of 7.5 g. of 2-[1-methyl-1,2,3,4-tetrahydro-6-quinolyl]-propionic acid ethyl ester in 45 ml. of methanol and the reaction mixture is boiled for 1 hours under reflux. Thereafter the methanol is evaporated off in vacuo, the distillation residue is dissolved in 50 ml. of water, and the aqueous solution is filtered off and adjusted to a pH-value of 4.8 by adding 2 N hydrochloric acid. The crystalline precipitate is stirred for 1 hour at 0° C., filtered off and rinsed with a little cold water. In this way 2-[1-methyl - 1,2,3,4 - tetrahydro-6-quinolyl]-propionic acid of the formula

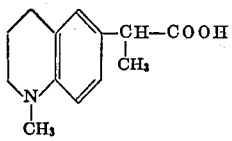

melting at 104–107° C. is obtained. The compound is a single substance in a thin layer chromatogram (system: chloroform-methanol (9:1); indicator: iodine; carrier: silica gel).

EXAMPLE 4

4.1 g. of [1-methyl-1,2,3,4-tetrahydro-6-quinolyl]-acetic acid ethyl ester are dissolved in 25 ml. of ethanol and saponified for 1 hour under reflux with 4.5 ml. of 40% strength NaOH. Thereafter the ethanol is evaporated off in vacuo, the distillation residue is dissolved in 50 ml. of water, the aqueous solution is filtered off and the filtrate is adjusted to a pH-value of 4.5 by adding 2 N hydrochloric acid. The crystalline precipitate is stirred for 1 hour at 0° C., filtered off, and the crystals rinsed with a little cold water. The resulting [1-methyl-1,2,3,4-tetrahydro-6-quinolyl]-acetic acid of the formula

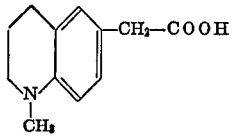

melts at 70–71° C.

EXAMPLE 5

At 5° C., 5.7 g. of chlorine are introduced into a solution of 17.0 g. (0.077 mol) of 2-[1-methyl-1,2,3,4-tetrahydro-6-quinolyl]-propionic acid in 260 ml. of 6 N hydrochloric acid. The solution is then stirred at 0° C. for 2 hours, and at room temperature for 16 hours. For working up, the hydrochloric acid solution is extracted with 2× 100 ml. of ether, stirred with activated charcoal, and filtered through diatomaceous earth. The clear filtrate is adjusted to pH 4.8 by the addition of 2 N-sodium hydroxide solution. The crystalline precipitate is stirred at 0° C. for one hour, then filtered with suction, and washed with a small amount of cold water. The crystals are recrystallized from hexane. 2-[1-methyl-8-chloro-1,2,3,4-tetrahydro-6-quinolyl]-propionic acid of the formula

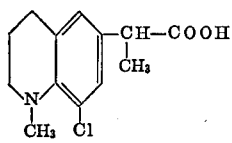

melts at 120–122° C. According to thin-layer chromatography (system: chloroform/methanol (9:1); indicator: dine; carrier: silica gel), the compound is unitary.

EXAMPLE 6

A solution of 3.5 g. [1-methyl-1,2,3,4-tetrahydro-6-quinolyl]-acetic acid in 50 ml. of 6 N-hydrochloric acid is chlorinated at 5° C. with 0.8 g. of chlorine. The solution is stirred at 0° C. for 2 hours, and at room temperature for 16 hours. For working up, the hydrochloric acid solution is extracted with 2× 50 ml. of ether, stirred with activated charcoal, and filtered with diatomaceous earth. The solution is adjusted to pH 4.8 by adding 2 N-sodium hydroxide solution, then saturated with sodium chloride, and extracted with 3× 500 ml. of chloroform. The organic phase is dried over sodium sulfate, filtered with suction and evaporated. There is obtained in this manner [1-methyl-8-chloro - 1,2,3,4 - tetrahydro-6-quinolyl]-acetic acid of the formula

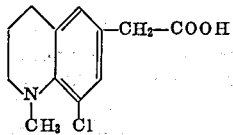

in the form of an oil.

EXAMPLE 7

To a solution of 4.38 g. of 2-[1-methyl-1,2,3,4-tetrahydro-6-quinolyl]-propionic acid in 60 ml. of absolute tetrahydrofuran are added dropwise at −10° C. first 2.75 ml. of triethylamine and then 2.65 ml. of chloroformic acid isopropyl ester. The solution is stirred for 1 hour at −5 to −10° C. Ammonia gas is introduced at this temperature for 30 minutes, and the batch stirred at 0° C. for another 16 hours. For working up, the reaction mixture is extracted with 2× 200 ml. of chloroform, the organic phases are washed with 2× 200 ml. of water, dried over sodium sulfate, filtered with suction and evaporated. The crystalline residue is dissolved in 2 liters of toluene:chloroform 1:1, and filtered through 150 g. of alumina (neutral: activity II). The filtrate is evaporated and recrystallized from ether. 2-[1-methyl-1,2,3,4-tetrahydro-6-quinolyl]-propionic acid amide of the formula

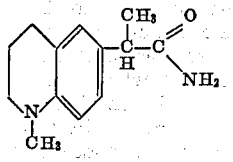

melts at 109–111° C.

EXAMPLE 8

While a solution of 5.0 g. of 2-[1-methyl-1,2,3,4-tetrahydro-6-quinolyl]-propionic acid in 230 ml. of benzene is being refluxed, it is treated dropwise in the course of 15 minutes with 23 ml. of oxalyl chloride. The solution is refluxed for a further 15 minutes, then stirred at room temperature for 2 hours. For working up, the benzene solution is evaporated under reduced pressure, the residue dissolved in 150 ml. of chloroform, and washed at 0° C. with 100 ml. of a 1 N-sodium hydroxide solution which has been cooled to −5° C. The chloroformic solution is washed with 2× 100 ml. of water, dried over sodium sulfate, suction-filtered and evaporated. The oily residue is dissolved in 180 ml. of dioxan. Ammonia is introduced into this solution at 0° C. for 4 hours. After that, the solution is refluxed for 1 hour. For working up, the solution is evaporated under reduced pressure, the residue is dissolved in 200 ml. of chloroform, and washed with 2× 200 ml. of water. The chloroformic solution is dried and evaporated. The residue is chromatographed on 200 g. of alumina (neutral; activity II). The fractions eluted with 2 liters of a 1:1 mixture of toluene and chloroform are recrystallized from ether and yield 2.0 g. of crystals melting at 109–111° C. According to melting point, mixed melting point, and thin-layer chromatogram (system: chloroform saturated with ammonia, and toluene 3:1 carrier: silica gel, indicator: iodine), the compound is identical with the 2-[1-methyl-1,2,3,4-tetrahydro-6-quinolyl]-propionic acid amide described in Example 7.

EXAMPLE 9

1.39 g. of hydroxylamine hydrochloride are dissolved in 7 ml. of methanol under reflux, and the clear solution is slowly cooled to 30° C. under nitrogen. The solution is then stirred while a solution of 1.68 g. of sodium hydroxide in 4 ml. of methanol is slowly added dropwise. By external cooling, the reaction temperature is kept at 0° C., and the reaction mixture is stirred for another 5 minutes at this temperature. After that, a solution of 2.5 g. of 2-[1-methyl-1,2-3,4-tetrahydro-6-quinolyl]-propionic acid ethyl ester in 5 ml. of methanol is added. The precipitated sodium chloride is filtered off with suction, and the clear filtrate allowed to stand at room temperature for 48 hours under nitrogen. The clear solution is then evaporated in vacuo, the residue dissolved in 10 ml. of acetic acid, and the clear solution heated at 80° C. for 1 hour. On cooling, 2-[1-methyl-1,2,3,4-tetrahydro-6-quinolyl]-propionhydroxamic acid of the formula

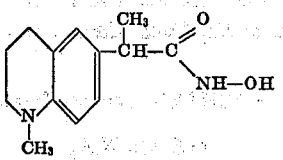

crystallizes out. After being recrystallized from ether, it melts at 107–109° C.

EXAMPLE 10

To a solution of 4.4 g. of [1,2,3,4-tetrahydro-6-quinolyl]-acetic acid ethyl ester in 80 ml. of acetone are added, first 7.4 g. of potassium carbonate, and then 3.1 g. of allyl bromide, and the reaction mixture is refluxed for 16 hours. The potassium carbonate is then filtered off, and the clear filtrate evaporated under reduced pressure. The residue is dissolved in 150 ml. of chloroform, and washed once with 100 ml. of cold 2 N-sodium hydroxide solution and twice with water. The chloroformic solution is dried over sodium sulfate, filtered with suction and evaporated. The residue is dissolved in 1 liter of chloroform: toluene 1:9, and the solution filtered through 150 g. of alumina (neutral; activity II). The filtrate yields on evaporation [1-allyl-1,2,3,4-tetrahydro-6-quinolyl]-acetic acid ethyl ester of the formula

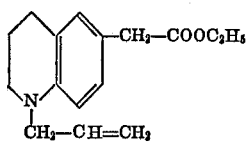

as an oil.

EXAMPLE 11

3.8 ml. of 40% sodium hydroxide solution are added to a solution of 3.7 g. of [1-allyl-1,2,3,4-tetrahydro-6-quinolyl]-acetic acid ethyl ester in 25 ml. of ethanol, and the mixture is refluxed for 1 hour. The ethanol is then evaporated under reduced pressure, the distillation residue is dissolved in 25 ml. of water, the aqueous solution stirred with activated charcoal, and filtered with suction through diatomaceous earth. The clear aqueous solution is adjusted to pH 4.8 by the addition of 2 N-hydrochloric acid, and the oily precipitate which forms is extracted with 250 ml. of chloroform. The chloroformic solution is dried and evaporated, and the residue dissolved in 25 ml. of ether. The batch is treated with a solution of 0.26 g. of sodium in 2.5 ml. of ethanol and 0.25 ml. of water, and the solution is evaporated under reduced pressure. In this manner, the sodium salt of 2-[1-allyl-1,2,3,4-tetrahydro-6-quinolyl]-acetic acid of the formula

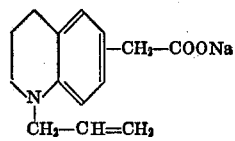

is obtained. After being recrystallized from methylene chloride, the compound melts with decomposition at a temperature of over 230° C.

EXAMPLE 12

Tablets containing 100 mg. of 2-[1-methyl-1,2,3,4-tetrahydro-6-quinolyl]-propionic acid may be prepared with the following ingredients:

| | Mg. per tablet |
|---|---|
| 2-[1-methyl-1,2,3,4-tetrahydro-6-quinolyl]-propionic acid | 100 |
| Lactose | 50 |
| Wheat starch | 73 |
| Colloidal silicic acid | 13 |
| Talc | 12 |
| Magnesium stearate | 2 |
| | 250 |

Method

The active substance is mixed with the lactose, part of the wheat starch, and with colloidal silicic acid, and the mixture passed through a sieve. Another portion of the wheat starch is pasted with the five-fold quantity of water on a water bath, and the powder mixture is kneaded with the paste until a slightly plastic mass is obtained. The mass is forced through an about 3 mm. mesh sieve, dried, and the dry granulate is again passed through a sieve. Then the remainder of the wheat starch, talc and magnesium stearate are admixed. The resulting mixture is compressed into tablets of 250 mg. each.

EXAMPLE 13

In an analogous manner to that described in the Examples 1–11 the following compounds may be prepared:

$\alpha$-(2-methyl-5-trifluoromethyl-1,2,3,4-tetrahydro-6-quinolyl)-butyric acid methyl ester $\alpha$-(7-methoxy-8-bromo-1,2,3,4-tetrahydro-6-quinolyl)-propionic acid $\alpha$-(5-methyl-8-ethylsulphonyl-1,2,3,4-tetrahydro-6-quinolyl)-acrylic acid benzyl ester $\alpha$-(5-hydroxy-7-nitro-1,2,3,4-tetrahydro-6-quinolyl)-crotonic acid cyclopentyl ester $\alpha$-(1-ethyl-5-mercapto-1,2,3,4-tetrahydro-6-quinolyl)-valeric acid $\alpha$-(1-allyl-5-amino-7-chloro-1,2,3,4-tetrahydro-6-quinolyl)-propionic acid cyclohexyl ester $\alpha$-(1-n-propyl-5-acetylamino-7,8-dichloro-1,2,3,4-tetrahydro-6-quinolyl)-propionic acid amide $\alpha$-(1-methyl-8-cyano-1,2,3,4-tetrahydro-6-quinolyl)-propionic acid phenethyl ester $\alpha$-(1-ethyl-5-sulphamyl-1,2,3,4-tetrahydro-6-quinolyl)-valeric acid tert.-butyl ester $\alpha$-(1-ethyl-5-methylsulfonyl-1,2,3,4-tetrahydro-6-quinolyl)-valeric acid isopropyl ester $\alpha$-(1-ethyl-5-methylmercapto-1,2,3,4-tetrahydro-6-quinolyl)-valeric acid isopropyl ester $\alpha$-(1-ethyl-5-methylsulfinyl-1,2,3,4-tetrahydro-6-quinolyl)-valeric acid isopropyl ester $\alpha$-(1-methyl-7-benzoylamino-1,2,3,4-tetrahydro-6-quinolyl)-propionic acid $\alpha$-(1-methyl-8-fluoro-1,2,3,4-tetrahydro-6-quinolyl)-propionic acid.

I claim:

1. A method for treating inflammation in a warm-blooded mammal which comprises administering to such mammal an anti-inflammatory effective amount of a compound of the formula in which X stands for a member selected from the group consisting of carboxy, carboxy esterified by a member selected from the group consisting of lower alkyl of up to 6 carbon atoms, allyl, methylallyl, lower cycloalkyl of 3 to 7 ring members, benzyl and phenethyl, aminocarbonyl and hydroxyaminocarbonyl; $R_1$ stands for a member selected from the group consisting of lower alkyl of up to 6 carbon atoms and lower alkenyl of up to 4 carbon atoms; $R_2$ stands for a member selected from the group consisting of hydrogen and lower alkyl of up to 6 carbon atoms; $R_3$ stands for a member selected from the group consisting of lower alkyl, lower alkoxy, hydroxy, halogen and trifluoromethyl, wherein the alkyl portion contains up to 6 carbon atoms, $n$ stands for 0 to 3; $R_4$ stands for a member selected from the group consisting of hydrogen and lower alkyl of up to 6 carbon atoms when $R_5$ stands for hydrogen and $R_4$ stands for lower alkylidene of up to 4 carbon atoms when $R_5$ represents a carbon-carbon bond, or a physiologically tolerable salt thereof together with a pharmaceutical carrier.

2. A method as claimed in claim 1, in which compound is α-(1-methyl-,2,3,4-tetrahydro-6-quinolyl)-propionic acid or a physiologically tolerable salt thereof.

3. A method as claimed in claim 1, in which compound is α-(1-methyl-8-chloro-1,2,3,4-tetrahydro-6-quinolyl)-propionic acid or a physiologically tolerable salt thereof.

4. A method as claimed in claim 1, in which compound is (1-methyl-1,2,3,4-tetrahydro-6-quinolyl)-acetic acid or a physiologically tolerable salt thereof.

References Cited

FOREIGN PATENTS 52,809  2/1967  Poland _____ 260—287

OTHER REFERENCES

Bojarska-Dahlis III, Rocz. Chem., vol. 39, pp. 1611–23 (1965).

STANLEY J. FRIEDMAN, Primary Examiner

U.S. Cl. X.R.

260—287